June 30, 1970  L. R. NEWFARMER  3,517,811
METHOD AND APPARATUS FOR FILTERING SUBMICROSCOPIC
SOLID PARTICLES FROM A FLUID CARRIER
Filed Jan. 21, 1969

INVENTOR:
LEO R. NEWFARMER
BY:
HIS ATTORNEY United States Patent Office 3,517,811

Patented June 30, 1970

1

3,517,811
METHOD AND APPARATUS FOR FILTERING SUBMICROSCOPIC SOLID PARTICLES FROM A FLUID CARRIER

Leo R. Newfarmer, La Jolla, Calif., assignor to Shell Oil Company, New York, N.Y., a corporation of Delaware Filed Jan. 21, 1969, Ser. No. 792,679

Int. Cl. B01d *13/00, 35/20*

U.S. Cl. 210—19 11 Claims

ABSTRACT OF THE DISCLOSURE

A method for filtering submicroscopic dissociated ions of a dissolved solid from a fluid carrier solvent by flowing the fluid carrier solvent through a plurality of vibrating membranes, the membranes having special properties and being oriented so as to deflect the dissociated ions of the dissolved solids in the fluid carrier solvent away from the main flow of the fluid carrier solvent.

Figure 1:
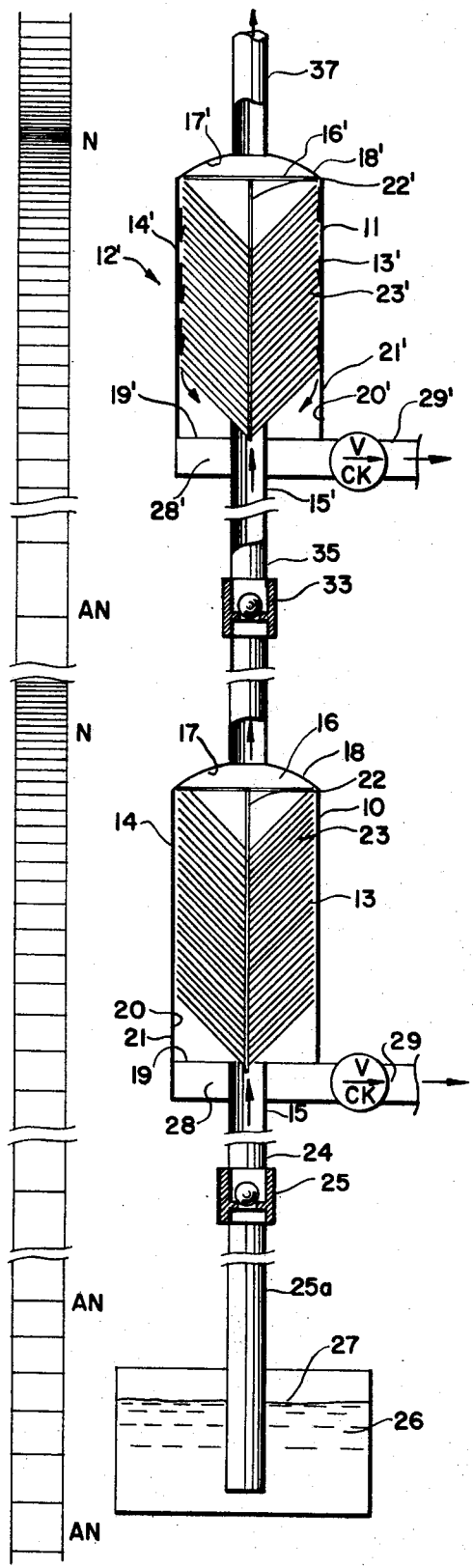

BACKGROUND OF THE INVENTION

Field of the invention

The invention relates to the separation of dissociated ions of dissolved solids from a fluid carrier solvent; and more particularly, to a method for separating hydrolized cations of a solid in solution such as salt from a fluid such as seawater.

Summary of the prior art

About one-third of the earth's land surface, including over sixty underdeveloped counties, is arid and in short supply of water. There is a critical need for an entirely new process for economically separating fresh water from seawater.

There are a number of basically dicerent techniques for producing good fresh water from salt water, using energy in one form or another. The problem with such prior art techniques is to produce the fresh water with such a small expenditure of energy that the total cost will be in "tolerable" limits, defined as follows:

$1.00 per thousand gallons for municipal water;
$0.50 per thousand gallons for industrial water;
$0.10 per thousand gallons for irrigation water.

Recovered "municipal water," in this context is already attainable with existing methods, but "industrial water" at this time is not.

It has been proposed to make use of the so-called "reverse osmotic" process by lowering a supported-membrane cell attached to the lower end of a conduit into the ocean to a sufficient depth where the pressure differential between a column of fresh water on the inside of the conduit and the ocean water on the outside of the conduit would be sufficient not only to overcome the osmotic pressure in the reverse direction but also to cause the column of fresh water to rise to a height above sea level, which would permit gravity flow to shore. The column of fresh water would have to be relatively long, for example at least eight hundred feet, before any "reverse-osmosis" could take place, so the conduit would have to be considerably longer than that, such as two or three thousand feet. However, diffusion rates through membranes capable of passing fresh water and rejecting salt are slow, so that very large areas of membrane would have to be exposed to gain a sufficient volume of fresh water. The initial cost of such a membrane would be very high and its life very short. One such prior art technique utilizing the reverse-osmosis process is described in a U.S. patent to Harvey, Pat. No. 3,306,397. The process of Harvey, in addition to the cost of the membrane, requires relatively high energy means in the form of magnetostrictive or electrostrictive transducers of mechanical gas- or liquid-driven generators.

2

In the "reverse-osmosis" effect, the membrane is formed of cellulose acetate or similar material, which material has the ability to pass water molecules while rejecting salt. It has been found that the salt-exclusion property of such membranes depends upon their ability to form a one-molecule-thick "skin," a kind of chemical union between the hydrated cations of the salts in solution and free hydroxyl groups at the surface of the polymer membrane. The components of the salts in the seawater are visualized as being restrained chemically from passing into the membrane. By especially coating such membranes with a large number of hydroxyl groups, it has been found that a greater flux of fresh water will take place from a salt solution (such as brine or seawater) than with conventional membranes. However, all such membranes, especially coated or not, would appear to have short useful lives—the greater the salinity of the solution feed, the shorter the membrane life.

SUMMARY OF THE INVENTION

It is an object of this invention to provide an improved method for filtering ionized solute from a fluid solvent.

It is the further object of this invention to provide an improved method for converting seawater into fresh water.

It is a still further object of this invention to provide a method for desalinating seawater using comparatively small amounts of energy.

These objects are preferably carried out by flowing the solvent containing the dissolved and dissociated solid through a plurality of vibrating semi-permeable membranes, the membranes being oriented so as to cause counter-current flow of solvent containing the greater proportion of solid solute away from the main flow, and thus by stages to diminish the amount of dissolved solids.

BRIEF DESCRIPTION OF THE DRAWING

FIG. 1 is a vertical sectional view of a preferred apparatus showing a pipe column for carrying out the method of my invention, with a compression-rarifaction wave diagram showing approximate placement of velocity nodes N and antinodes AN in the pipe column of my apparatus; and FIG. 2 is a diagrammatic illustration of the path of the fluid carrier through the membranes of FIG. 1.

DESCRIPTION OF THE PREFERRED EMBODIMENT

Although the invention will be described hereinbelow to the removal of salts from seawater, i.e., the desalination of seawater, the concepts of my invention are applicable to the filtering out or removal of many soluble substances from water-base solvents and acids, the only limitation being that the "atomic volume," i.e., the bulk dimension of the solids in their ionized state shall be appreciably larger than that of the containing fluid.

Referring to the drawing, a preferred arrangement is shown for carrying out the method of my invention. FIG. 1 shows a pair of 1st and 2nd stages 10 and 11 of a vertical pipe column 12 which may include a plurality of such stages. A plurality of ultra-fine mesh membranes 13 and 13' composed of suitable semi-permeable material, such as a felt of corrosion-resistant metal fibers, or synthetic hydrophobic polymer, or of unglazed ceramic material, are disposed in each stage 10 and 11, respectively. The membranes 13 and 13' are preferably nested together as a series of inverted cones in 1st and 2nd chambers 14 and 14', respectively. These cones may be structural members which may be covered with any of several different kinds of materials; in fact, a graduation of different materials may be used on the different cones in an individual stack. Membranes and coatings which are too permeable to be used in a static "osmotic cell" can take on "semi-permeable" salt-rejection properties when "stacked" and subjected to vibration of the right frequency and amplitude. The chambers 14 and 14' are preferably circular in cross-section with an internal diameter preferably twice the inside diameter of influx pipes 15 and 15', respectively. Membranes 13 and 13' are rigidly affixed in chambers 14 and 14'. For example, cross-rod 16 may be rigidly fixed to the internal wall 17 of upper cap portion 18 of chamber 14, while a similar cross-rod 19 is fixed to the internal wall 20 of the lower portion 21 of chamber 14. Similarly, cross-rod 16' may be rigidly fixed to the internal wall 17' of upper cap portion 18' of chamber 14' while a similar cross-rod 19' is fixed to the internal wall 20' of the lower portion 21' of chamber 14'. Central vertically-disposed rods 22 and 22', respectively, may be rigidly fixed to the central portions of cross-rods 16, 16', 19 and 19', respectively, as illustrated in FIG. 1.

Figure 2:
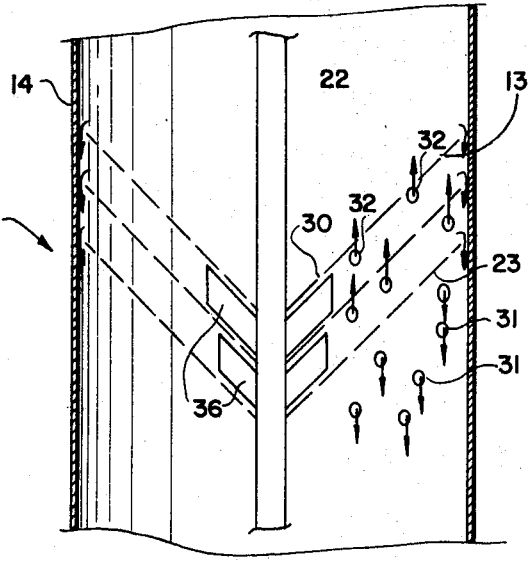

The cones 23 and 23' of membranes 13 and 13' are preferably separated from each other by suitable separating means such as conical washers 36 (FIG. 2). Washers 36 have been omitted in FIG. 1 for convenience of illustration.

The vibration-actuated valves (represented by pump valve 25) of a relatively large-diameter sonic pump, such as either of the pumps described in U.S. patents to A. G. Bodine, Jr., Nos. 3,127,842 and 2,902,937, may be disposed at the bottom of each stage of column 12. In other words, stage 14 may be coupled into the pump tubing string 24 of a sonic pump which operates from vibrations transmitted down the column from an oscillator mounted at its head, as disclosed in the aforementioned patents. For convenience of illustration, the operating portions of the pump and the description of such operation have been omitted in FIG. 1. The pump valve 25 is illustrated as in communication with a fluid source 26 through tubing string 25a in a general application; however, in the "ocean-water-well" situation, the entire column would be immersed in sea water, as source 26.

Dense-fraction discharge sections 28 and 28' are associated with the lower portions 21 and 21' of each chamber 14 and 14', respectively. Discharge sections 28 and 28' preferably include check valved-release outlet means 29 and 29', respectively which discharge to waste, in the general situation, or in the downstream direction with respect to oceanic currents.

In operation, upon actuation of valve 25 of the pump (not shown) exciting a standing wave of vibration, the membranes 13 are caused to oscillate up and down. This vibration pumps the fluid column and also acts as an automatic scrubbing action on membranes 13, cleaning off the one-molecule "skin" of membranes 13, thus constantly keeps exposing fresh surfaces to the activity of the hydrated cations of the salts in the briny fluid. Such a sloughing of the "skin" would not produce much wear on membranes 13 since such "skins" are believed to be only one molecule thick as discussed hereinabove. The foregoing discussion of membranes 13 is also deemed applicable to the membranes of all the chambers.

Referring now to FIG. 2, it has been found that a very wide-mesh screen series can effect physical sorting of the various sizes in a solids mixture and hence membrane barriers whose openings are grossly oversize with respect to individual atoms can result nevertheless in shunting the relatively larger ones to the outside. This may be accomplished by staggering the openings 30 as shown in FIG. 2 so that the fluid carrier passes in a tortuous path through openings 30. Thus, the relatively smaller molecules 32 of the fluid carrier (such as fresh water) pass upwardly through the stages while the relatively larger ones 31 (i.e., the salt), which are also heavier than the fluid carrier molecules, pass outwardly and downwardly of the stages to the discharge sections 28 and 28', as indicated by the direction of the arrows in FIGS. 1 and 2. The fact that openings 30 can be grossly larger than individual molecules 31 in a series of vibrating barriers of this nature and still effect a size-separation permits the use of membranes in this system of much greater permeability and consequent greater through-put than would be possible with any static arrangement. Bearing in mind that one primary objective is to minimize energy requirements, it can be shown that a resonant sonic system has several advantages: first, when dealing with a dilute solution, wherein the total weight of dissolved salts (solids) is small as compared to the total weight of the water (solvent) it is obviously advantageous to "lift" the solids out of the solvent rather than the other way around; secondly, as vibratory motion causes both the impingement action and propulsion of the fluid stream in the desired direction, it is necessary to maintain such motion throughout the mass of the apparatus. Because of inertia and resistance, this would require relatively large expenditures of energy except in a "tuned" resonant system wherein inertial effects are reduced to near zero, as taught by the aforementioned Bodine patents.

Once again referring to FIG. 1, pump valve 25 is used to take water from source 26 upwardly within the stages of column 12 at a relatively fast velocity. The liquid from source 26, such as seawater, passes across membranes 23 at a predetermined angle and at a reduced velocity. The openings 30 in the individual membranes 23 are slightly out of phase with each other, owing to their differing distances from the antinode AN (FIG. 1) of the standing wave in the column excited by the tuned oscillator (not shown). The art of establishing standing waves of longitudinal vibration in columns of pipe or tubing is well known, and for every length there is some convenient natural harmonic which will serve to divide it into regularly-spaced segments with nodes one-half wave length apart. The main component of motion of membranes 23 is vertical due to their rigid attachment to the column in an antinodal region; however, because of the Poisson principle, each membrane 23 also simultaneously executes very slight motion parallel to the horizontal plane. The "pitch" of the membranes 23 and the fineness of openings 30, as well as the material of membranes 23, may be adjusted along with the frequency of vibration so as to maximize the probability that a molecule of salt or dissociated hydrolized sodium or chlorine ions (relatively twice as large as their $H_2O$ counterparts), if released near the apex of the first vibrating cone 13 will, in its upward path through membranes 23, collide with a membrane surface (rather than pass through a pore opening) more often than the water. The net result will be that the salt will tend to get concentrated in the outer and downward portions of the chamber 14 (FIG. 2) at the expense of the fluid in its inner portion. This outer "shell" of fluid is then slightly more dense than the inner fluid, and it may be discharged through the check valved-release outlet means 29 which may be oriented in a down-current direction with respect to the prevailing currents of the source 26.

The volume of freshened fluid carrier, such as water, expelled upwardly from the first stage 10 is picked up by a tubing string 33 coupled to a second-stage pump valve 34, similar to pump valve 25, which is in turn coupled through tubing string 35 to the inlet 15' of the next stage 11. Thus, the process is repeated with the efflux from the first stage 10 used as feed for the second stage 11. The number of molecules of salt is proportionately decreased, i.e. the solution is now more dilute, but the probability that the larger, heavier molecules or ion-aggregates will be deflected by membrances more often than the water remains in approximately the same ratio. Thus, again, the remaining salt content of the liquid is partially deflected to the outer shell; is discharged through outlet means 29' of the second stage 11; and the remaining volume is pumped upwardly through outlet 37. Third or more stages, as required, may be serially coupled to outlet 37 in the manner described hereinabove with respect to stages 10 and 11. These third or more stages are thus merely repeats of stages 10 and 11, each time using the efflux freshened water as feed for the next upward stage. Since potable fresh water may have a salinity of 300 parts per million and as calcium sulfates and carbonates, etc., are also eliminated using the technique of my invention because of the larger relative sizes of their molecules and hydrated ions, the resultant fresh water is "soft," ideal for industrial and minicipal use.

The kind and size of prime mover means, optimum amplitude and frequency of vibration, optimum length and metal material for the vibrating assembly, and optimum pore size and material for membrances 23 and 23' and the effective size of discharge openings may be experimentally determined from mathematical analyses of the flow diagram of column 12. Since the natural frequency of the column 12 is a function of the length of the column (not its diameter) in combination with the modulus of elasticity of the material from which the column is fabricated, the volume of water moved is in part determined by the frequency selected; also, it may be more or less arbitrarily fixed by choice of diameter of input and outflow pipes and by the capacity of the oscillating pump valves 25 and 34 below the entrance of each successive desalination chamber.

I claim as my invention:

1. A method for filtering dissociated ions of a dissolved solid from a fluid carrier solvent comprising the steps of:
   flowing said carrier through a plurality of fine-mesh semi-permeable membranes, the membranes being oriented with respect to the direction of flow of the fluid carrier solvent therethrough so as to deflect said dissociated ions in the fluid carrier solvent away from the main flow of said fluid carrier solvent upon vibration of said membranes; and
   vibrating said membranes so as to deflect said dissociated ions.

2. The method of claim 1 wherein the step of deflecting said dissociated ions includes the step of passing said fluid carrier solvent containing said ions upwardly in a tortuous path through said membranes whereby a greater proportion of fluid carrier solvent molecules pass out of said membranes in the direction of flow of said fluid carrier solvent while a corresponding concentration of dissociated ions of said dissolved solid is deflected outwardly away from the direction of flow of said fluid carrier solvent.

3. Apparatus for filtering dissociated ions of a dissolved solid from a fluid carrier solvent comprising:
   a conduit for flowing said fluid carrier solvent therethrough;
   fluid flowing means for flowing said fluid carrier solvent through said conduit;
   fine-mesh membrane means disposed in the path of said flowing fluid carrier solvent, said membrane means being oriented with respect to the direction of flow of the fluid carrier solvent therethrough so as to deflect said dissociated ions in the fluid carrier solvent away from the main flow of said fluid carrier solvent; and
   vibrating means operatively engaging said membrane means for vibrating said membrane means.

4. The apparatus of claim 3 wherein said membrane means are composed of synthetic hydrophobic polymer material.

5. The apparatus of claim 3 wherein said membrane means are composed of corrosion-resistant metal material including felted fibers.

6. The apparatus of claim 3 wherein said membrane means are provided with ceramic material.

7. The apparatus of claim 3 wherein said membrane means are composed of corrosion-resistant metal material including sponge material.

8. The apparatus of claim 3 wherein said conduit is a vertical column comprising a plurality of stages having said membrane means disposed therein; and
   said vibrating means includes sonic pump means associated with each of said membrane means disposed in each of said stages.

9. The apparatus of claim 8 wherein said membrane means comprise a plurality of nested spaced inverted cones, the apex of said cones extending in the direction opposite the direction of flow of said fluid carrier solvent.

10. The apparatus of claim 9 wherein said conduit includes fluid carrier inlet means associated with each of said stages and both said stages and said inlet means are circular in cross-section with the internal diameters of said stages being substantially twice the internal diameters of said inlet means; and
    densified-fluid outlet means associated with each of said stages for removing said dissociated ions.

11. A method for filtering dissolved soluble mineral salts from a saltwater solution comprising the steps of:
    flowing said saltwater solution upwardly through a plurality of fine-mesh semi-permeable membranes, the membranes being oriented with respect to the direction of flow of said saltwater solution therethrough so as to deflect said dissolved mineral salts in said saltwater solution away from the main flow of said water solution upon vibration of said membranes; and
    simultaneously vibrating said membranes while flowing said saltwater solution therethrough so as to deflect said dissolved mineral salts.

References Cited

UNITED STATES PATENTS

| | | | |
|---|---|---|---|
| 3,192,126 | 6/1965 | Fear | 210—19 X |
| 3,456,805 | 7/1969 | Jarvis et al. | 210—321 |

FOREIGN PATENTS

| | | |
|---|---|---|
| 548,246 | 11/1957 | Canada. |

SAMIH ZAHARNA, Primary Examiner

F. F. CALVETTI, Assistant Examiner

U.S. Cl. X.R.

210—21, 321